E. Carver.
Sharpening Mach.
N°. 1,718.
Patented Aug. 12, 1840.

Witnesses;
Caleb J. Sunn
Klu Wilbur

Inventor;
Eleazer Carver

E. Carver
Sharpening Mach.
No. 1,718.   Patented Aug. 12, 1840.

Witnesses;

Inventor;
Eleazer Carver

E. Carver.
Sharpening Mach.

N°. 1,718. Patented Aug. 12, 1840.

Witnesses:
Caleb J. Hunt
Kilee Wilbur

Inventor:
Eleazer Carver

Sheet 5, 7 Sheets.

E. Carver
Sharpening Mach.

Nº 1,718. Patented Aug. 12, 1840.

Fig. 3.

Detail of Files, &c.

Plan
Fig. 9.
Detail of Saw &c.

Side at F
Fig. 6.

End Elevation
Fig. 7.

Side at G
Fig. 8.

Witnesses;
Caleb J. Hunt
Helen Wilbur

Inventor;
Eleazer Carver

E. Carver.
Sharpening Mach.
No. 1,718.  Patented Aug. 12, 1840.

Witnesses;
Caleb J. Hunt
Hiles Wilbur

Inventor;
Eleazer Carver

E. Carver.
Sharpening Mach.
No. 1,718. Detail of Saw &c. Patented Aug. 12, 1840.

Side at F
Fig. 9.

End Elevation
Fig. 10.

Side at G  Fig. 11.

Witnesses;
Caleb J. Hunt
Kleb Wilbur

Inventor;
Eleazer Carver

UNITED STATES PATENT OFFICE.

ELEAZER CARVER, OF BRIDGEWATER, MASSACHUSETTS.

MACHINE FOR FILING OR SMOOTHING THE TEETH OF SAWS.

Specification of Letters Patent No. 1,718, dated August 12, 1840.

*To all whom it may concern:*

Be it known that I, ELEAZER CARVER, of Bridgewater, in the county of Plymouth and State of Massachusetts, have invented a new and useful Machine for Filing or Smoothing the Teeth of Saws; and I do declare the following to be a full and exact description thereof.

My invention consists in causing the saws which are to be filed or smoothed to pass with a regularly intermittent motion of the distance of one tooth under a file to which a movement is given corresponding with the motion of the saw-plate and the form of the tooth to be filed, and the whole so combined and arranged in its parts, that during the time in which the file is acting upon the teeth the plate is holden steadily and without motion until the file has performed its office, at the same time giving to the file a peculiar compound motion which may be varied so as to be accommodated to the perfect filing of any saw tooth.

My design in constructing this machine was more particularly for filing and smoothing the teeth of the saws used in the cotton gins (though the same principle may be applied to the filing and smoothing the teeth of other saws,) and I will now more particularly describe the arrangements and combination of parts which are fitted for this purpose. They are such that the circular saw plates used in cotton gins whether in whole circles or segments are confined in a convenient position either vertical or horizontal, between two strong circular metal plates of less diameter than the saws to be filed. Of these metal plates one is fastened permanently to a shaft which causes it and the saw plate to revolve and the other is movable and pressed and holden upon the saw according to the form of the saw plate to be filed. If the saw to be filed is a whole circle the movable plate should be whole, and be held upon the plate by means of a nut fitted upon the shaft which gives the revolving motion, or by spring catches, or some other convenient method, as is or may be seen in the drawing hereto annexed. But if the saw plates are in semicircular segments, the movable metal plate should be divided into two equal parts or half disks, connected together by metal straps with hinge joints at each end so that the one half may be pressed hard upon the plate to confine it by springs as in the drawing annexed while that segment is being filed and at the same time, the other half may be relieved or raised to take out or admit another segment without any loss of time or stoppage of the machine. On this same shaft to which the saw plates are adjusted are two cog-wheels each having the same number of teeth as those of the saw; these two cog-wheels are both made fast to the shaft, and so far apart as to allow the play of the two cylinder wheels hereafter described; the one of these cog-wheels has its teeth cut straight, that is, perpendicular to the plane of the wheel; the other has its teeth cut beveling or oblique to the plane of the wheel; the teeth of these cog-wheels play into threads raised upon two small cylinder wheels which are fixed upon two horizontal shafts parallel to each other. Of these cylinders the one has oblique threads like those of an endless screw extending half around it, and playing into the oblique teeth of its corresponding cog-wheel. The other cylinder has straight threads, that is, perpendicular to its axis, extending half around its circumference, but on the side opposite to that on which the threads of the other cylinder are placed; these straight threads play into the straight teeth of the other cog-wheel. These two cylinders are placed about the middle of their shafts, and have an equal motion, the shaft of the one being turned by the winch or handle by which the machine is moved and having on it a small cog-wheel near one end of it, playing into an equal cog-wheel on the shaft of the other cylinder. The diameters of these two cylinders are the same, and the obliquity of the thread on one is such in proportion to its diameter, that it will during that half of its revolution, in which its threads play into the teeth of the oblique toothed cog-wheel turn that wheel and the shaft the distance of one tooth of the wheel, and of the space between two saw teeth. The threads of that cylinder then being disengaged from the teeth of the wheel, the straight threads of the other cylinder strike into the straight teeth of the straight toothed cog-wheel, and hold it, and the shaft still during the other half revolution of the two cylinders and until the threads of the oblique threaded cylinder strike again into the teeth of the corresponding cog-wheel, and so on alternately giving to the two cog-wheels and the shaft and to the saw plate an intermitting motion at equal intervals, each movement being equal to the distance between two contiguous teeth of the saw to be filed, and the saw plate being during the intervals of motion held firmly in its place while the tooth is filed. If however it is desired to file saw teeth being more than three eighths of an inch apart, let only one cylinder wheel be used and only one cog-wheel with teeth alternately straight and oblique, and of the cylinder wheel let a straight thread extend around half its circumference and an oblique thread around the other half so that the cylinder wheel as above described by working alternately in the straight and oblique teeth of the cog-wheels will give the same intermitting motion to the saw plate to be filed as the apparatus before described. The operation of filing is performed by the following described parts of the machine if the machine is constructed as in the drawing.

On the shaft of the cylinder on which are the oblique threads, and near the two ends of it, are two eccentric cams the form of which will appear by the drawings and of which the operation will be hereinafter described. On these cams rest the ends of two bars which extend horizontally backward and at right angles with the shaft of the cylinders and are attached at the other ends by a pivot to the rear corner posts of the frame of the machine, so that as the cams turn the end of the bars resting upon them rise and fall as the greater or less diameter of the cam passes under them. Upon the ends of these bars which rest upon the cams are erected two upright posts with a transverse beam across the top making a vertical gallows frame rising and falling as the cams turn. Into the lower side of the transverse beam of this gallows, but somewhat nearer to that side of the machine on which the file is to be applied to the saw than to the other, a bar is inserted and made fast parallel to the two end bars of the gallows and extending down about one third the length of those bars. From the lower end of this short bar, another bar extends horizontally to the rear of the frame and is there attached to an upright post in the frame; this last bar turns on a pivot at each end making movable vertical joints. Directly under this bar, and parallel with it, and at a short distance below it, another shorter bar is immovably fixed by one end to the same upright post while the other end projects forward about two thirds as far as the upper bar, this lower bar being considerably higher than the saw plate. From each of these two bars and near the front end of it is suspended a perpendicular metal rod, having a joint at the top, by which it swings from front to rear and having a screw and sliding groove at the top by which its length and points of suspension may be adjusted; the rods also are hung from the bars by a longitudinal slit in the bar by which the point of suspension may be carried forward or backward for adjustment and confined with a screw. The rod which hangs from the upper and longer bar reaches down nearly to the level of the saw plate and the rod which hangs from the lower and shorter bar reaches considerably lower than the other and below the saw plate; to the lower ends of these two rods is fastened a metal bar of which one end projects in front over the edge of the saw plate and on the under side of it is fixed by a screw by which it can be removed at pleasure, a triangular prismatic file which operates upon the teeth of the saw. This metallic bar is fastened to the end of that rod which hangs from the upper bar by a flat metal spring bent and projecting forward in a horizontal position and firmly fixed to the foot of the rod by one end, but attached by the other end to the upper side of the metal bar at a point nearer to the saw, by a hinge joint, so that the spring may press the file down upon the teeth of the saw. On the front end of the frame and just over the edge of the saw are two thin perpendicular and parallel strips of metal between which the metal bar and file pass. These serve as guides to the file. The other end of the metal bar is about twenty degree lower than the forward end and is attached by a pivot to the end of the other metal rod, and also to the end of another shorter metal bar, which runs horizontally to the rear of the frame. The two metal bars, and the metal rod making at this point a movable vertical point. The other end of this shorter metal bar is attached by a pivot also making a movable vertical joint to the lower end of another perpendicular bar through the upper end of which a transverse square shaft passes having its bearings and turning on gudgeons in the two rear posts of the frame near the top. This shaft passes just under the upper one of the two bars from which the two metal rods are suspended, and passes quite through and a little beyond the rear post on the side of the frame opposite to that to which the power is applied to move the machine, and to that projecting end of the shaft is fixed the upper end of another perpendicular bar which hangs outside of the frame. To the lower end of this last bar is attached by a movable joint one end of a horizontal bar of which the other end is attached to a crank on the end of the shaft of the upper cylinder to the other end of which the winch is applied to move the machine. I will now describe the operation of this part of the machine which performs the filing. The turning of the winch while it gives the intermitted motion above described to the saw, also turns the crank on the other end of the shaft; this by means of the parts above described causes the transverse square shaft which passes across the rear of the frame to turn a few degrees forward and backward as the crank turns; this gives an oscillating motion to the bar suspended from that shaft and also to the two metal rods; by the backward motion of the square shaft, the file is drawn back between two teeth of the saw and pressed down upon them by the spring during that half revolution of the cylinder which holds the saw plate still, and the file is then raised by the operation of the cams, and by the forward motion of the square shaft is pushed forward without touching the saw, while by the other half revolution of the cylinders the saw moves around the space of one tooth, and is ready for the next stroke of the file, which then by the operation of the cams fall between the two next teeth of the saw and is drawn back as before. The above combination gives a peculiar compound motion to the file, it being attached to the rods which are suspended from different points of motion, which points of motion may be altered at pleasure, and this together with the position of the file in the file bar, it being so placed that the side of the file next to the shorter edge of the tooth shall be nearly at right angles with the plane of the saw, so operates that when the file is let down by the cam upon the tooth it touches it near the point at an angle of about twenty degrees with the plane of the saw, and upon being drawn backward continually diminishes said angle and by that means follows up and between the teeth giving a slightly curvilinear form to the longer edge of the tooth.

I will now proceed to describe my said machine by reference to the drawings annexed see drawing marked No. 1. Z is the winch that moves the machine and turns F, the shaft of the upper cylinder K, and the small cog wheel G, which turns the equal cog wheel H, which is fixed on the shaft I, of the lower cylinder K. $s'$, $t$, are the straight threads of the upper cylinder which work into the straight teeth of the upper large cog wheel L. $o$, $k$, are the oblique threads of the lower cylinder that work into the oblique teeth of the lower large cog wheel M, by which two operations the shaft N, is alternately held fast by the upper cylinder and wheel and turned by the lower cylinder and wheel giving an intermitted motion to the saw $o$, $o$, which is fixed on the shaft N, between the lower plate and the upper plate and held fast by the nut or spring $h$, $f$. P, P, are the cams on the upper cylinder shaft. R, R, are the horizontal bars of the gallows frame resting on the cams. S, are the upright posts, and T is the transverse beam of the gallows. U, is the short vertical bar fastened into the lower side of the beam T, into which is inserted the end of the longer horizontal bar V, from which hangs the metal rod W, having at the top the screw $w$, to regulate the length of the rod, and the nut $x$, to fasten it when adjusted. $a$, is an upright piece of metal bent over at the top attached to the bar V, by the screw $b$, which passes through the longitudinal slit $c$, in the bar, and a vertical slit $d$, in the piece $a$, by which the rod may be adjusted either by raising or lowering it, or by moving it from front to rear. $f$, is the flat spring by which the rod W, is attached to the metal bar $g$, which carries the file $h$. $i$ is the hinge joint, by which the spring is connected with the metal bar $g$. $j$, are screws by which the file is confined in its place. $l$ is the other metal rod, which is hung from the bar $m$, by another upright piece of metal $n$, by the screw $p$. This piece of metal $n$, is doubled over at the top so as to embrace the top of the rod $l$, and is attached to the short horizontal bar $m$, by the screw $p$, which passes through a longitudinal slit $v$, in the bar, and a vertical slit in the piece $n$, so as to allow the rod to be adjusted raising or lowering it or by moving it from front to rear. $s$, is the vertical joint at the other end of the rod $l$, by which it is connected with the file bar $g$, and the horizontal metal bar $t$. $u$, is the oscillating bar into which the end of the short metal bar is inserted by a vertical joint V, $v$. Y is the square transverse shaft on which the oscillating bar $u$, is hung. $z$ is the bar that hangs from the end of that shaft outside the frame to the lower end of which bar the horizontal bar 1 is attached by the vertical joint 2. The other end of the bar 1, is attached by the screw 3, 3, to the crank 4, which is on the end of the shaft F, of the upper cylinder. So that the winch Z thus turns the two cylinders K K, by which the intermitted motion is communicated to the large cog wheels L, M, and to the saw plate O. At the same time, the cams on the upper cylinder shaft raise and let fall alternately the gallows frame which by means of the rod W, raises and lowers alternately the file bar and file. At the same time the winch Z, turns the crank 4, on the other end of the upper cylinder shaft and that by the horizontal bar 1, swings the hanging bar $z$, which turns the transverse square shaft Y, and causes the bar $u$, to oscillate or swing from front to rear drawing the file bar and file forward and backward alternately, as they are made to rise and fall by means of the cams raising and letting down the gallows.

Figure 9:
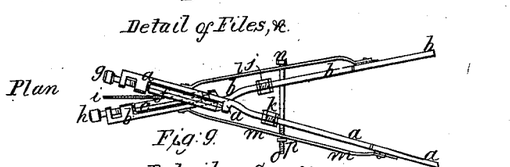
Figure 10:
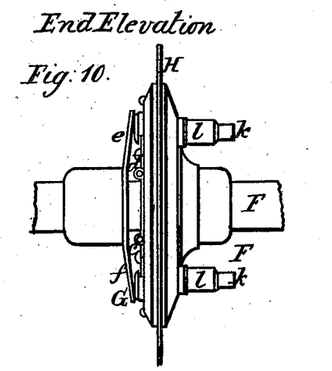
Figure 11:
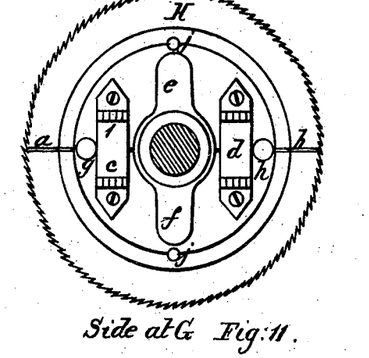

Figs. 9, 10, 11, show the detail of the method of confining the circular segments of saws to be filed. Fig. 9, shows the detail of one of the metal plates which is fastened permanently to the shaft F; Fig. 11, the other and movable one. Fig. 10, shows a profile of the plates and the saw as adjusted for filing and smoothing the teeth. In Fig. 11, a b, is the line of division between the halves of the plate. c, d, are the metal straps with hinges at each end by which the halves of the movable plate are connected. e, f, is a spring which is fastened to the shaft and presses the movable plate against the saw H, and g h are screw holes in both plates, the screws being made fast in the whole plate, and playing loose in the holes of the divided plate, the object of the screws being to keep the plates in their relative position with each other, and also to serve as guides by which to adjust the segments to be filed, small quadrants being cut on the inner corners of the segments to fit the body of the screw. i, i, i, i, are holes in which pins are made fast into one of the plates and enter into corresponding holes in the other to aid in keeping saw plates steady. j, j, are holes for two pins that are fixed in one plate and pass through holes in the segment and enter into corresponding holes in the other, for the same purpose. In Fig. 9, m, m, are two plugs that slide in the tubes l, l, in Fig. 10, of which the ends are shown at K, K. The object of these is to press the plates apart when a segment is to be taken out or inserted which plates are pressed back again by the spring e, f.

The same principle may be applied to rounding and smoothing the edges of the teeth of saws used in cotton gins by a modification of the machine already described which I will here suggest, and particularly describe to prevent any one from claiming the same as his own invention. The circles or semicircular segments may be confined and receive their motion in the same or a similar manner as before described, or the motion given to the saw may be continuous as by the use of a single cog wheel and endless screw, as will be seen by the annexed drawing. To smooth the corners and points of the teeth let two files be used the sides of which have a more obtuse angle with each other than the prismatic three cornered file used in the filing machine before described, for the purpose of preventing their sinking so deeply into the spaces between the teeth, and to enable them to slide more readily laterally over the sides of the teeth smoothing and rounding their corners and points. If the saw be confined in a vertical position as in the drawing, these two files are applied to the lower edge of the saw, each being attached to file bars which are attached to rods hung on moving joints like those in the filing machine already described, and which receive their vibrating or forward and backward motion in like manner. But in this form of the machine, the cams and gallows frame will be unnecessary as the files operate both in their forward and backward motion. The files are so hung as to cross each other that they may operate on opposite sides of the saw, at such an angle as will allow the files to work into the spaces between the teeth and to act on their edges and points, and are regulated in respect to the pressure with which they rest upon the saw plate by springs as will appear in the drawing.

Besides the forward and backward movement, the files have another motion parallel to the plane of the saw and over the sides of the teeth, which motion is given them by the vibrating or oscillating movement of the rods suspended over and attached to the file bars, so that during their forward and backward motion, they pass over the sides of one or more teeth, being pressed into the spaces between the teeth by springs as before described, smoothing and rounding the points and corners of the teeth while the saw revolves slowly.

The motion given to the saw may be continuous as is shown in the drawing, or intermittent as described in the filing machine. But in each case the saw plate should be so placed in the machine as that the files in their forward motion should pass from the point toward the root of the tooth, and the saw made to revolve in the direction in which the teeth point. If the intermittent motion is given to the saw plate (which I think is preferable) the forward motion of the file should be applied while the saw is at rest, and the backward motion while the saw moves over the space of one tooth, so that in all cases whether the saw revolves in an intermittent or continuous motion, the last action of the file upon a finished tooth should be in the direction opposite to that in which the tooth points, because otherwise the files would be apt to turn or bend the point of the tooth which by the above described action of the files is left smooth and rounded.

Figure 1:
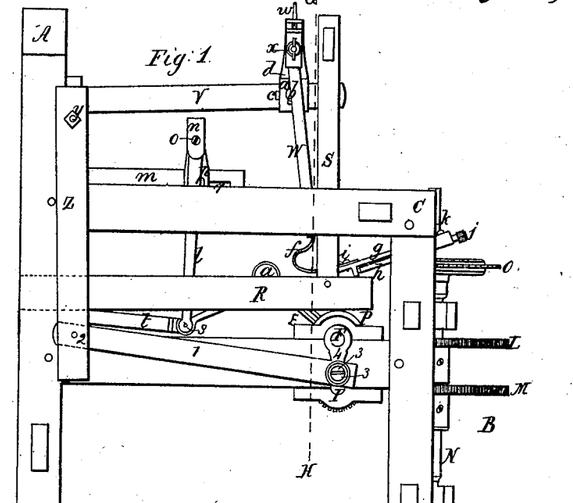
Figure 2:
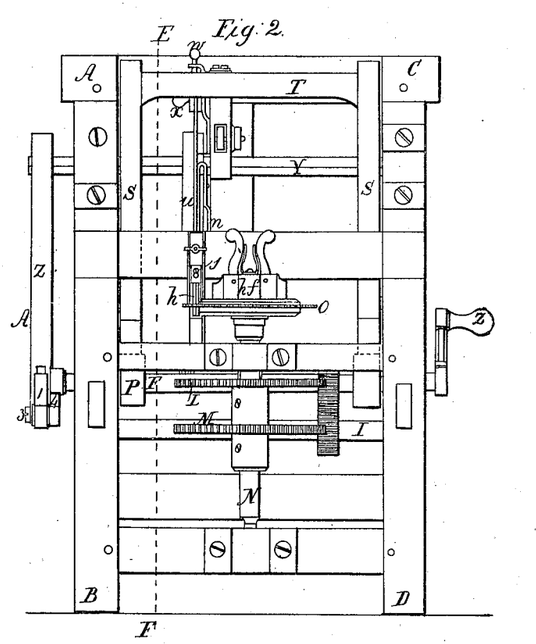
Figure 3:
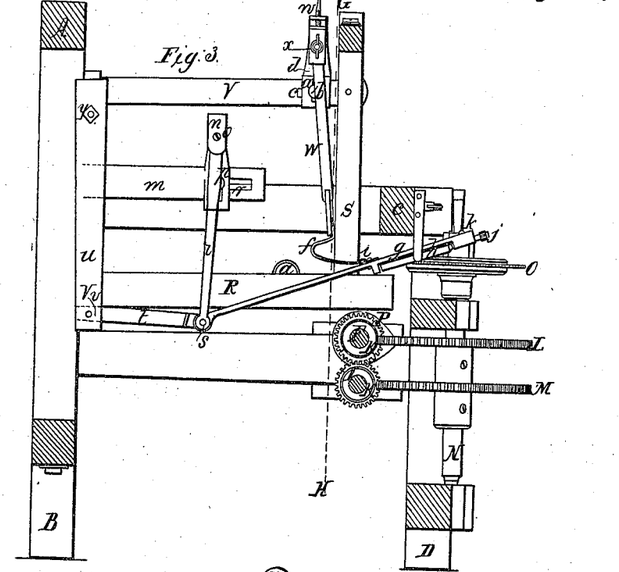
Figure 4:
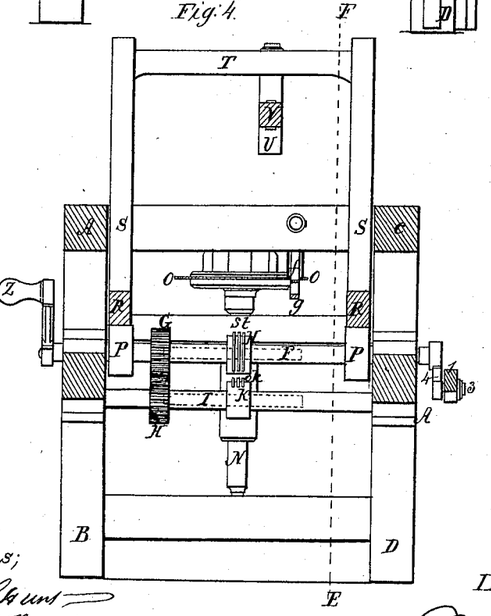
Figure 5:
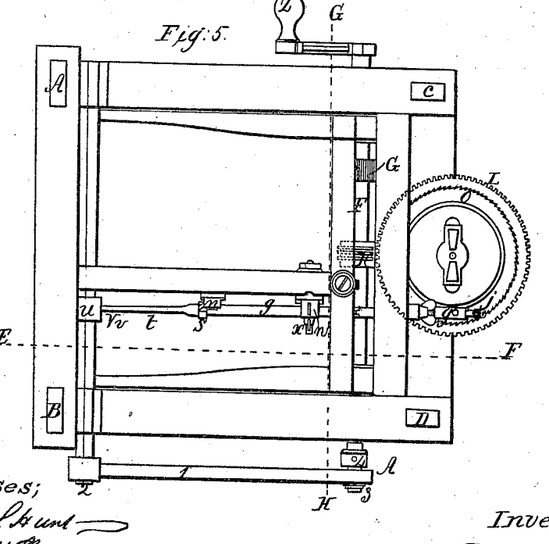

I will now proceed to describe the modification last referred to by reference to the drawings as in plate No. 2. Fig. 1 is a side elevation on the side of the winch. Fig. 2 is longitudinal section on the line A, B, of Figs. 4 and 5. Fig. 3 is an end elevation showing the rear of the machine. Fig. 4 is an end elevation showing the front of the machine. Fig. 5 is a top view. In all these several figures the parts represented by the following letters and figures, where they are visible in the respective figures are as follows.—1 is the winch that turns the machine. 2 is the crank on the same end of the shaft. 3 is the shaft turned by the winch. 4 is the meter wheel on the shaft and 5 is the crank on the other end.

6 is the other meter wheel which is turned by the wheel 4 and turns its own shaft and the endless screw 7; the endless screw 7, turns the cog wheel 8, and its shaft 9. Carrying with it the two metal plates 10, and 11, and the saw 12, 13, 14, are the two horizontal bars attached to the two cranks which swing the two perpendicular bars 15, 16, and turn the two square shafts 17, 18, a few degrees backward and forward: the turning of the shafts causes the swinging bars 19, and 20, to oscillate from front to rear—these again by means of the two metal bars 21, 22, cause the other swinging bars 23, 24, to oscillate in the same manner pushing forward and drawing back alternately the file bars 25, 26, and the files 27, 28. 29 is a screw on the end of each file bar by which to fasten in the files.

Figure 6:
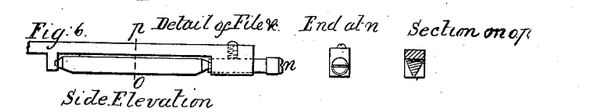
Figures 6, 7, 8:
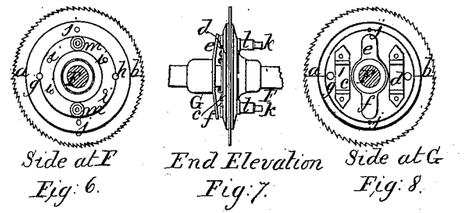
Figure 7:
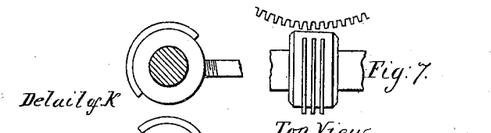
Figure 8:
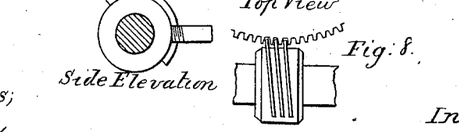

Fig. 6 shows the detail of one of the metal plates and Fig. 8 the other, and Fig. 7 shows a profile of the plates and the saw adjusted for smoothing. In Fig. 8 $a\ b$, is the line of division between the halves of the plate. $c, d$, are the hinges by which the two halves of the plate in Fig. 8 are connected. $e\ f$ is a spring which is fastened to the shaft and presses the plate against the other. $g\ h$, are screw holes in both plates the screws being made fast in the whole plate Fig. 6, and playing loose in the holes of the divided plate Fig. 8. To permit these screws to pass through when the segments of the saw are introduced, a corresponding quadrant is cut out of the two inner corners of each segment. $i, i, i, i$, are holes in which pins are made fast into one of the plates and enter into corresponding holes in the other to keep the saw plate steady. $j, j$, are holes for two pins that are fixed in the plate Fig. 8, and pass through the holes in the segments and enter into holes in plate $b$, for the same purpose. $k, k$, Fig. 7, are two plugs that slide in the tubes $l, l$, and of which the ends are shown at $k$. These plugs and tubes are also shown in Figs. 4, and 5, and are there marked K, K, the object of these is to press the plates apart when a segment is to be taken out and a new one put in. $m$, in Fig. 4, is a perpendicular lever having its fulcrum $n$ in the front of the frame; by pressing the lower end of the lever toward the winch 1, when one of the plugs is opposite to the lever, the upper part bears against the plug $k$, and pushes it into the tube $l$, and against the plate shown in Fig. 8, and causes that half of the plate to open on the hinges $c, d$, so that the segment may be withdrawn and a new one inserted. The lever $m$ in Fig. 4, is bent half over the shaft of the saw plate at the top so that the pressure may be applied to the plug $k$, when it reaches the vertical point in the revolution of the saw. This form is shown in Fig. 2.

Fig. 9, shows the details of the files, &c. $a, a$, is the upper file bar. $b, b$, is the lower file bar. $f\ e$, are the two files. $g, h$ are the screws that fasten the files in their places. $i$, is a profile of the saw. $j, k$, are the junction of the file bars with the rods by which they are suspended. $l\ m$ are springs that pass from one file bar to the other, pressing these files across each other so as to keep them hard against the teeth of the saw during the whole stroke. The action of these springs is regulated by a pin $n, o$, which passes through both springs and confines the springs between the head $n$ of the pin, and the nut $p$, on the other end.

What I claim as my invention and desire to secure by Letters Patent is—

The machine above described consisting in a combination of the said several parts for giving a regularly intermitted motion to the saw-plate, and for holding the same still and steady in the intervals of motion, and of the parts for filing the teeth.

ELEAZER CARVER.

Witnesses:
 CALEB J. HUNT,
 KILEA WILBAN,